United States Patent Office 2,736,638
Patented Feb. 28, 1956

2,736,638

DETECTION OF SULFUR DIOXIDE

Paul W. McConnaughey, Wilkinsburg, Pa., assignor to Mine Safety Appliances Company, Pittsburgh, Pa., a corporation of Pennsylvania No Drawing. Application July 14, 1953,
Serial No. 367,971

13 Claims. (Cl. 23—232)

This invention relates to the detection and to the quantitative determination of sulfur dioxide ($SO_2$).

An object of the invention is to provide a simple, rapid and reliable method of detecting the presence of sulfur dioxide in gases, particularly air, that may be practiced by unskilled persons, that is satisfactory for plant, field and laboratory use, that requires only simple, inexpensive and readily available materials and apparatus.

A further object is to provide a method in accordance with the foregoing object that is additionally adapted to the direct quantitative determination of sulfur dioxide, especially in very low concentrations.

Yet another object is to provide a device for practicing the method of this invention that is light, inexpensive, easily used, adapted to all types of use, and gives satisfactory results in the hands of non-technical personnel.

The invention is predicated upon my discovery that its objects are attained by passing the air or other gas to be tested through an elongate body of a chemically inert carrier that has been treated with a solution of iodine or nitric acid and then with tetramethyldiamino-diphenylmethane (TDD), which produces a blue color. When air to be tested is passed through such a reagent body disposed in a tube of glass or other transparent material that is not affected by the reagent, the presence of sulfur dioxide causes the blue color to change to white along the length of the body of reagent in the direction in which the air is passed, thus affording indication of the presence of $SO_2$. The length over which the bleaching occurs, is dependent, when tested under standard conditions, upon the $SO_2$ concentration in the atmosphere tested. Thus I provide for the detection of sulfur dioxide as well as for its quantitative measurement.

The carrier, preferably a granular adsorbent, does not enter into the color producing and destroying reactions but serves merely as a chemically inert physical carrier for the reagent. In this way liquid reagents and their attendant disadvantages are avoided. Among the known adsorbents silica gel and diatomaceous earth give satisfactory results, with silica gel preferred. Consequently the invention will be described, by way of illustration, with particular reference thereto.

In accordance with the invention the silica gel, or other adsorbent, is treated with dilute iodine solution or dilute nitric acid, and after the gel has become impregnated it is treated with the tetramethyldiaminodiphenylmethane (TDD).

Bromine solution may be used in place of iodine solution, and it in turn is preferred over nitric acid. Although solutions in such solvents as ethanol or glycerine may be used, aqueous solutions suffice and are preferred for most purposes. The TDD is mostly suitably used in the solid state by mixing thoroughly with the impregnated adsorbent until the blue color has developed uniformly throughout the body.

The concentration of the dilute iodine or nitric acid solution is not critical, and the proportions of it and the TDD may vary, depending on the sensitivity desired. In the preferred practice of the invention 100 gm. of nitric acid washed and purified silica gel are impregnated with 30 cc. of iodine solution (28.75 cc. of distilled water and 1.25 cc. of 0.01286 N iodine solution) by mixing until all of the gel particles are uniformly impregnated. Then 0.2 gm. of TDD is added and thoroughly dispersed, by agitation, over the gel granules until the blue color appears, which occurs in a few minutes.

In the practice of the invention the gas to be tested is passed through a body of the gel. Although this may be done in a variety of ways, it is preferred, especially for field use, to apply it in the general manner described in Patent No. 2,174,349 to John B. Littlefield. I. e., an elongate column, or bed, of the inert granular material carrying the reagent is disposed in a small cross-sectional tube of glass or other transparent material, the ends of which are then sealed. When a determination is to be made the sealed ends are opened and the air or other gas to be tested is flowed through the tube by any suitable means. In the presence of sulfur dioxide the blue color is promptly destroyed.

In addition to being useful for detecting qualitatively the presence of $SO_2$, the invention is applicable also to its quantitative determination. To this end a measured volume of the gas to be tested is passed through a tube as just described, and the length over which the blue color is bleached affords a direct measure of the $SO_2$ concentration. For this purpose the measured volume of air may be supplied in various ways, as by means of an aspirator bulb of known volumetric delivery. By comparing the length over which the bleaching occurs with a scale calibrated by the use of the standard volume of different known $SO_2$ concentrations in air there is thus a direct determination. The bleaching is permanent so that the tubes serve for record purposes, if desired, after being resealed in any appropriate manner.

As indicating the sensitivity of this reagent, it is possible using tubes prepared as described above to detect quantitatively 0.1 p. p. m. by volume of $SO_2$ in air using a 50 ml./minute sample for 10 minutes with a tube of 2.2 mm. I. D. having a 2 inch length of the impregnated gel held in place by glass tape wadding.

Such reagent tubes stored at room temperatures for six months retain their ability to undergo the characteristic bleaching by $SO_2$, which indicates that they will continue to do so for an indefinitely long time. However, by the end of six months storage they have undergone a change in sensitivity so that although they continue to be suited to the detection of $SO_2$ they no longer suffice for its quantitative determination.

I have discovered, however, that sensitivity for adequate quantitative use upon prolonged storage, of the order of years, is to be had by a simple modification. In this modified embodiment of the invention the reagent is supplied in the form of an ampoule containing a granular adsorbent carrier, such as silica gel, impregnated with dilute iodine or nitric acid solution, and a second ampoule containing granular inert carrier coated with TDD. When a test is to be made the contents of the two ampoules are emptied into a bottle which is then closed and shaken so that the two carriers are thoroughly mixed whereby the TDD is distributed over the silica gel particles. Tubes for test purposes are then filled with the mixture, with the determination being carried out as just described. This procedure permits a shelf life of several years for the components, plus at least a few weeks for the mixed gel when in sealed tubes.

In this embodiment the TDD is preferably coated on a non-absorbent carrier such as sand although other inert carriers may be used such, for example, as tiny glass beads, glass powder, talc and the like.

As an example, 100 gm. of silica gel after acid washing and drying are treated with iodine solution as described above, and the gel is then placed in a sealed ampoule or tightly closed container. 20 gm. of sand is mixed thoroughly with 0.2 gm. of TDD to coat all the particles, and then similarly packaged. These containers with a suitable mixing bottle, testing tubes and an aspirator provide the kit necessary together with, of course, wadding for the ends of the bed in the tube and the scale for quantitative measurement.

The silica gel should be neither too fine nor too coarse so that the tube will contain an adequately packed body of the reagent without creating too great resistance to flow. We have found that silica gel passing 35 and retained on 60 mesh gives satisfactory results. In the case where it is used initially to carry the iodine or nitric acid solution and the TDD is mounted separately, the carrier for it may be of the same mesh range.

A factor that is important to optimum performance of the method, and in the use of the reagent provided by the invention, is that with tubes of 1.1 to 3 mm. bore packed with reagent granules of the size specified above, the sampling rate should not exceed about 60 ml. per minute.

Tests of a large number of amines have shown that they do not suffice as substitutes for tetramethyldiaminodiphenylmethane. Thus, when used with or without iodine solution the following compounds gave no colorimetric reaction with $SO_2$: diazoamino benzene, 8 hydroxyquinoline, para rosaniline base, 4 benzene-1-naphthylamine, basic fuchsin, p-dimethylaminoazophenyl-arsonic acid, diphenylamine, ethyl-2, 6-dimethylquinolinium and n,n-dimethyl-p-phenylazoaniline hydrochloride.

Similarly, the following compounds were wholly unsatisfactory because any color change was not sufficient, because they lacked sensitivity or because the color was fugitive, fading in most cases in less than one day in the absence of $SO_2$: p-nitrosodiphenylamine, phenylenediamine, 2,4-dinitrophenylhydrazine, p-nitrosodiethylaniline, o-tolidine, methyl-p-phenylene diamine dihydrochloride, 4 aminobiphenyl and phenyl alpha naphthylamine.

It is therefore my belief that for the purposes of the invention the action is specific to TDD.

The specific iodine solution referred to above is the standard iodine solution containing potassium iodide (KI) used for volumetric analysis.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of determining sulfur dioxide present in a gas which comprises the steps of passing gas to be tested through an elongate body of chemically inert granular solid carrying blue reaction product of tetramethyldiaminodiphenylmethane and an oxidizing agent of the group consisting of dilute iodine solution, dilute bromine solution and dilute nitric acid solution, which product upon contact with sulfur dioxide is bleached to white.

2. A method of determining the concentration of sulfur dioxide according to claim 1, comprising passing a predetermined volume of air to be tested through the elongate body, the bleaching of the blue color occurring over a length of said body that is dependent on the concentration of sulfur dioxide in the gas being tested, and measuring the length over which the bleaching occurs.

3. A method according to claim 1, said solid being an adsorbent.

4. A method according to claim 3, said adsorbent being silica gel.

5. A method according to claim 1, said solid being an adsorbent and per 100 gm. thereof carrying reaction product of 1.25 cc. of 0.01286 N iodine solution in 28.75 cc. of water, and 0.2 cc. of tetramethyldiaminodiphenylmethane.

6. Means for determining sulfur dioxide in a gas comprising the combination of a sealed transparent tube, and disposed therein a body of chemically inert granular solid carrying blue reaction product of tetramethyldiaminodiphenylmethane and an oxidizing agent of the group consisting of dilute iodine solution, dilute bromine solution and dilute nitric acid solution, said product upon passage through the tube, after breaking the seal, of gas carrying sulfur dioxide being bleached to white.

7. Means according to claim 6, said solid being an adsorbent.

8. Means according to claim 7, said adsorbent being silica gel.

9. Means according to claim 6, said solid being an adsorbent and per 100 gm. thereof carrying reaction product of 1.25 cc. of 0.01286 N iodine solution in 28.75 cc. of water, and 0.2 cc. of tetramethyldiaminodiphenylmethane.

10. A method of determining sulfur dioxide in a gas comprising mixing a granular adsorbent carrying an oxidizing agent of the group consisting of dilute iodine solution, dilute bromine solution and dilute nitric acid solution with a granular solid carrying tetramethyldiaminodiphenylmethane until a blue color is produced, forming the mixture into an elongate body of small cross sectional area in a transparent tube, and passing gas to be tested through the tube, sulfur dioxide present in the gas bleaching the blue color to white.

11. A method according to claim 10, said solid being non-adsorbent.

12. A method according to claim 11, said adsorbent being silica gel, and said solid being sand.

13. A method according to claim 10, 100 gm. of said adsorbent carrying 1.25 cc. of 0.01286 N iodine solution and 28.75 cc. of water, and 20 cc. of said solid carrying 0.2 gm. of tetramethyldiaminodiphenylmethane.

References Cited in the file of this patent

UNITED STATES PATENTS

| | | |
|---|---|---|
| 2,174,349 | Littlefield | Sept. 26, 1939 |
| 2,176,462 | McAllister | Oct. 17, 1939 |
| 2,534,229 | Carhart et al. | Dec. 19, 1950 |

OTHER REFERENCES

Feigl: "Chem. of Specific, Selective and Sensitive Reactions," page 315, Academic Press, Inc., Publ., N. Y. C., 1949.

Backer et al.: "Proc. Koninkl Nederland Akad Welenschap," vol. 53, pages 1507–1510 (1950) citing Chem. Abstracts, vol. 45, col. 9028 (1951).